Patented Nov. 4, 1924.

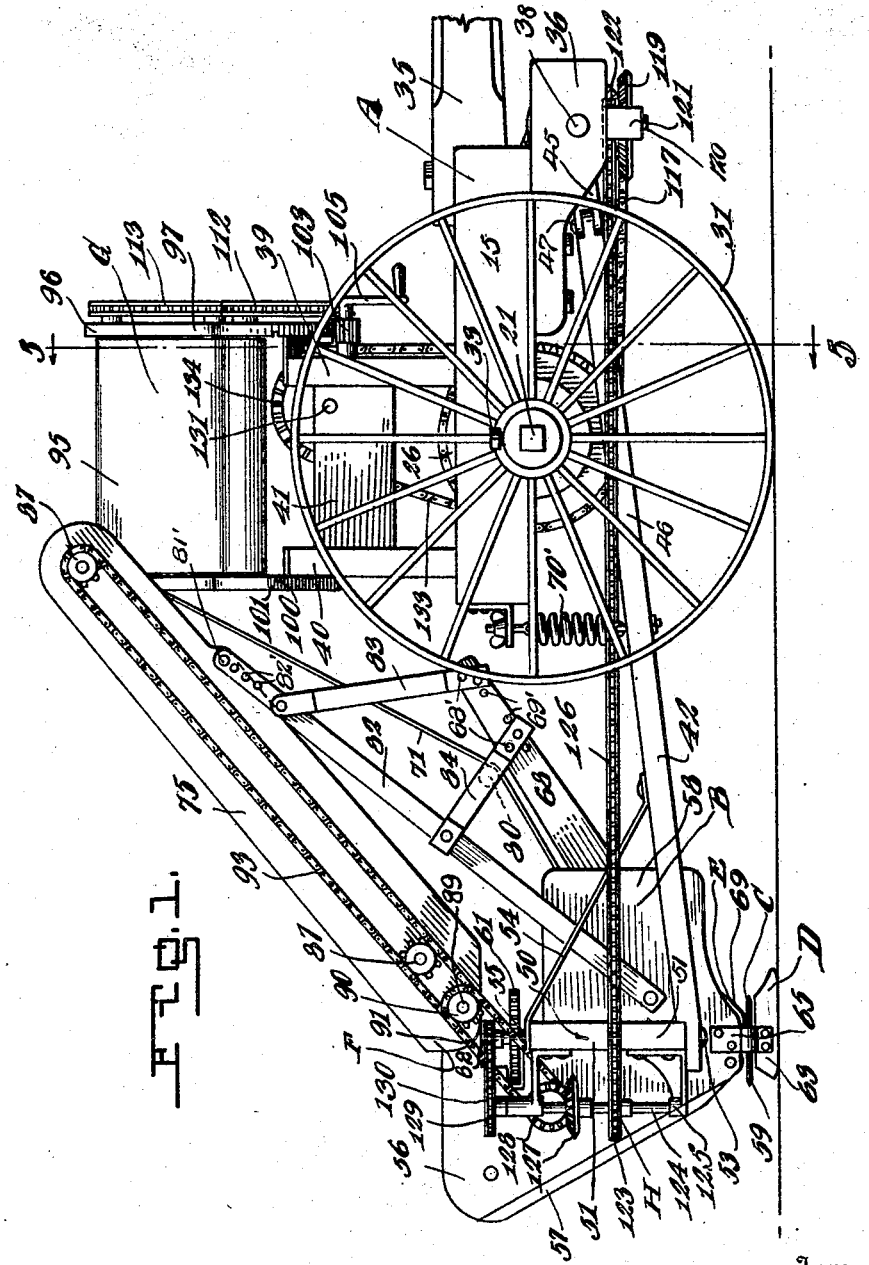

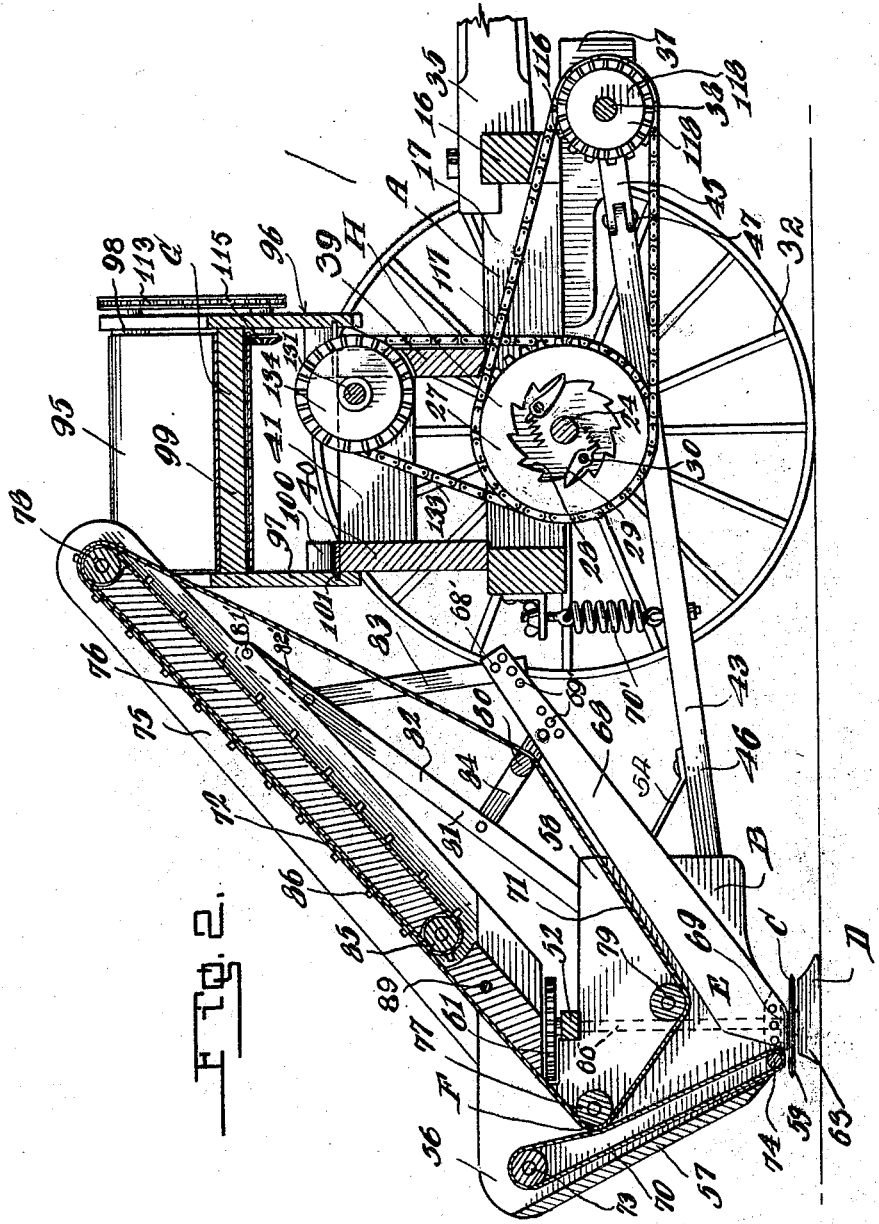

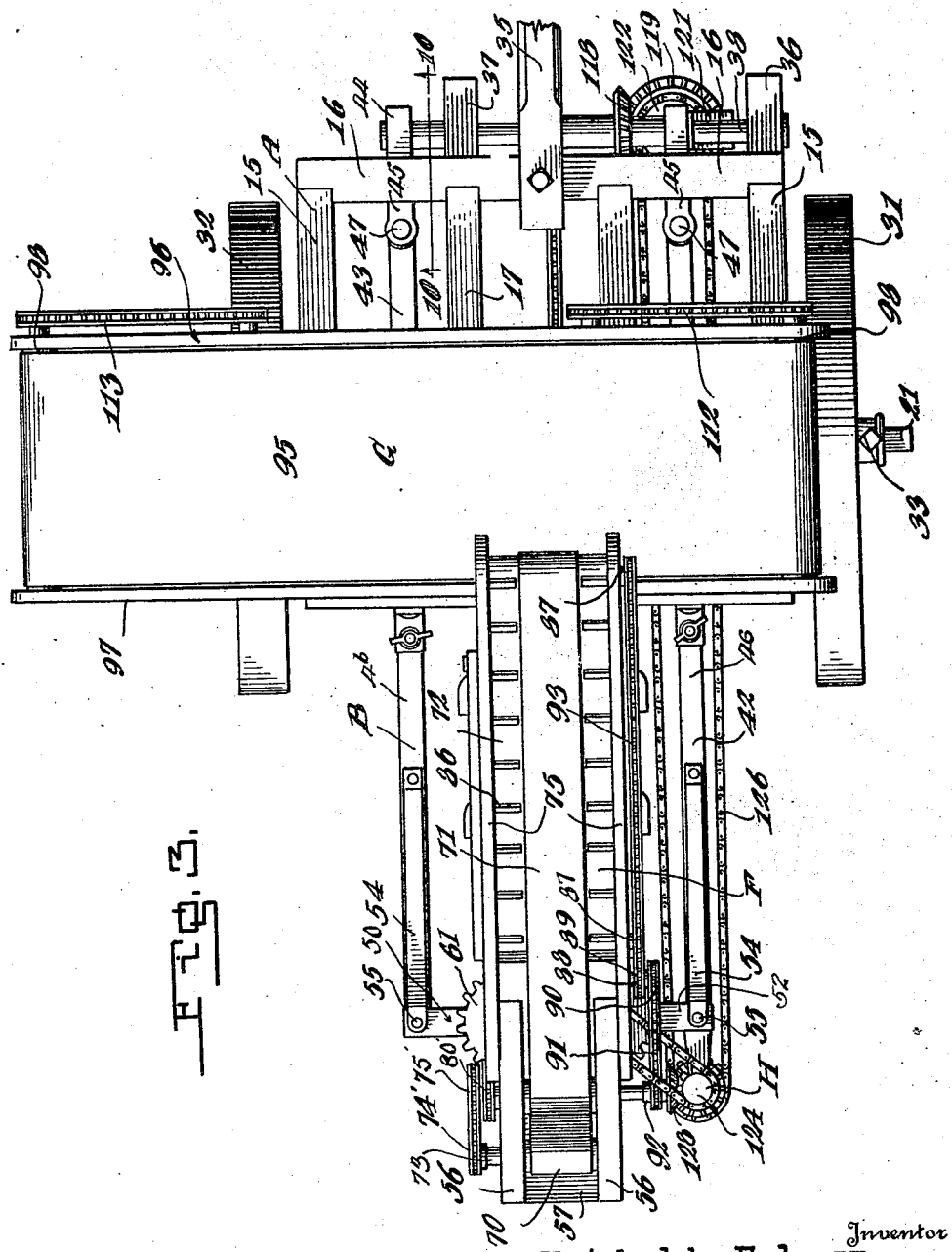

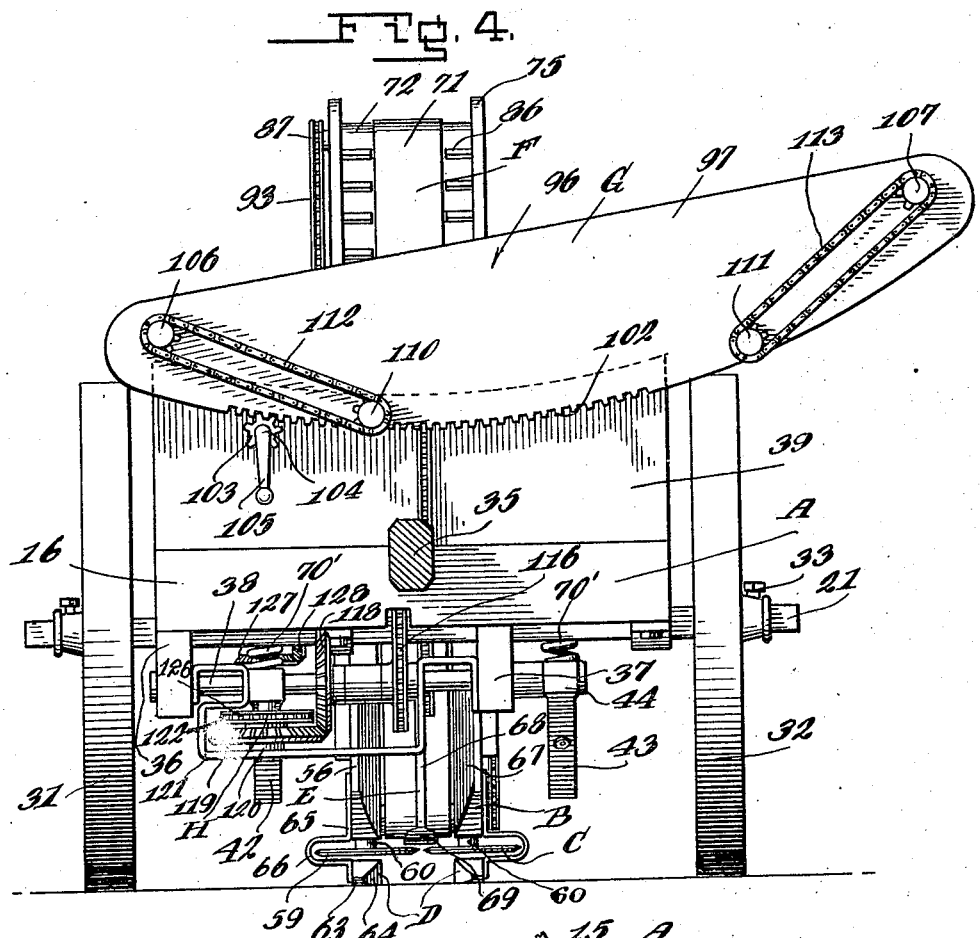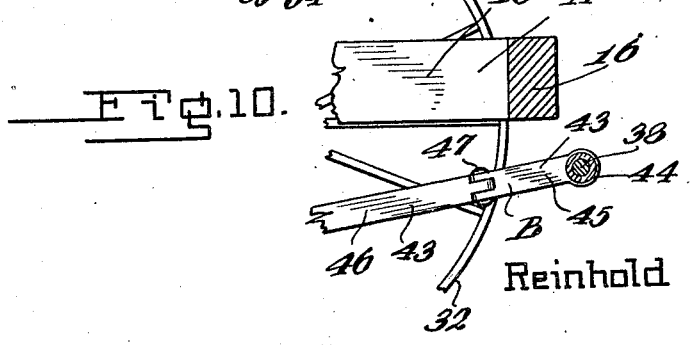

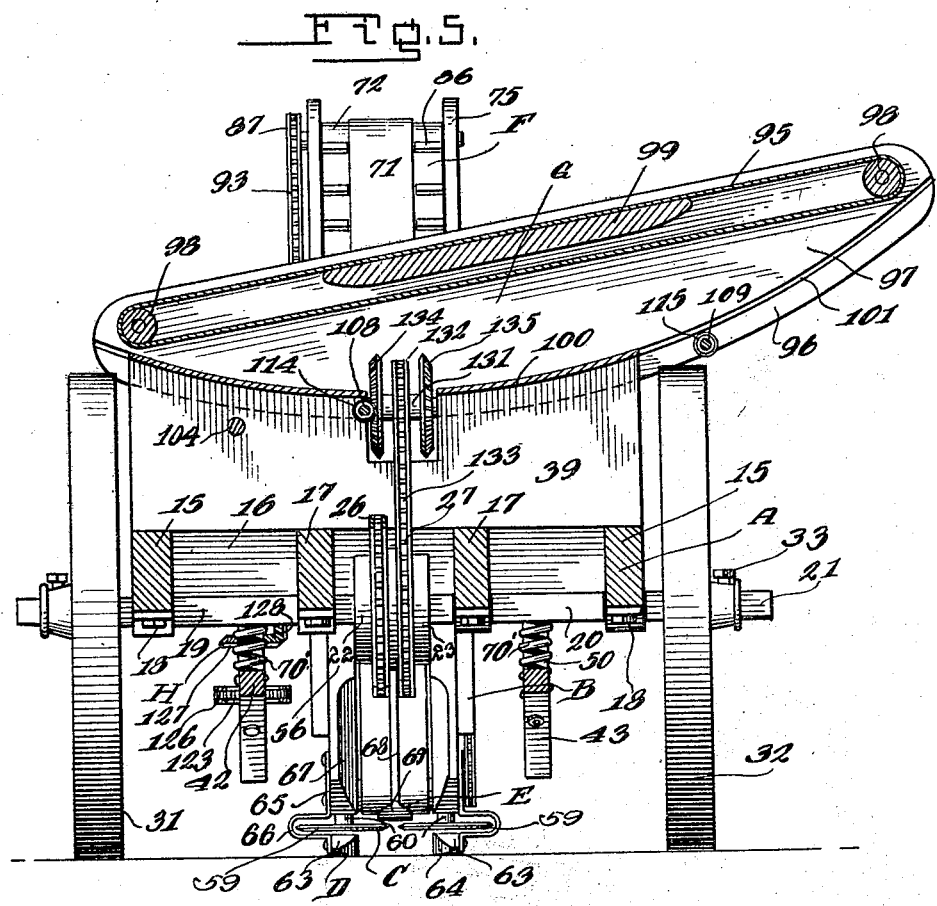
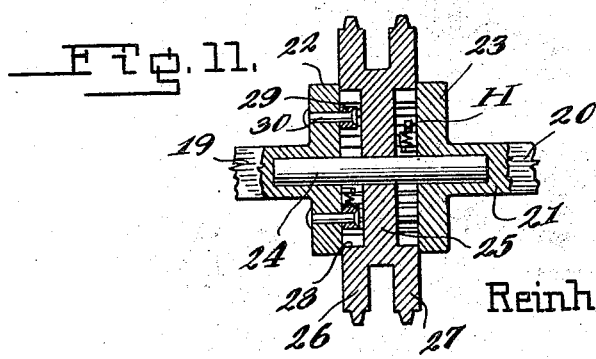

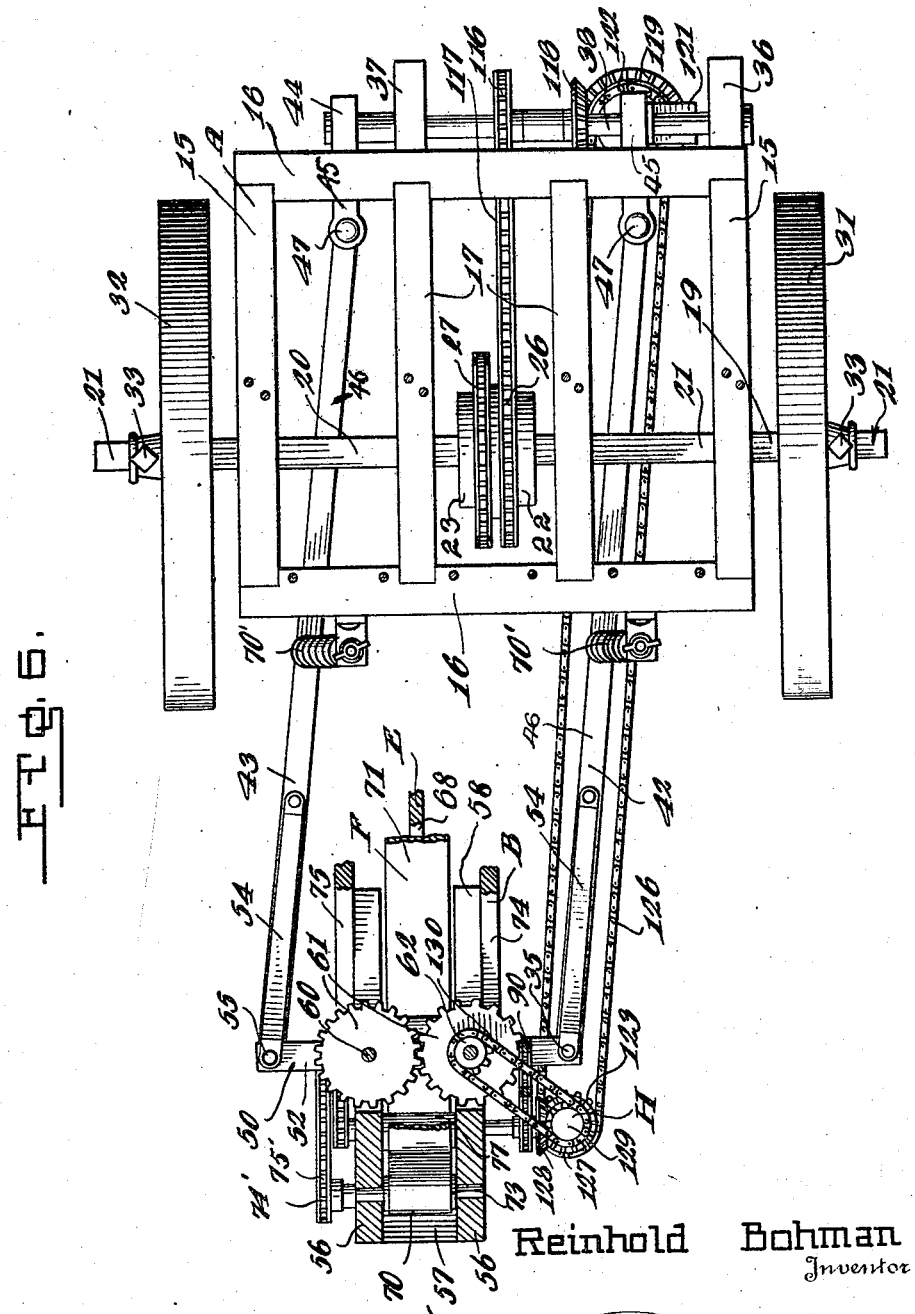

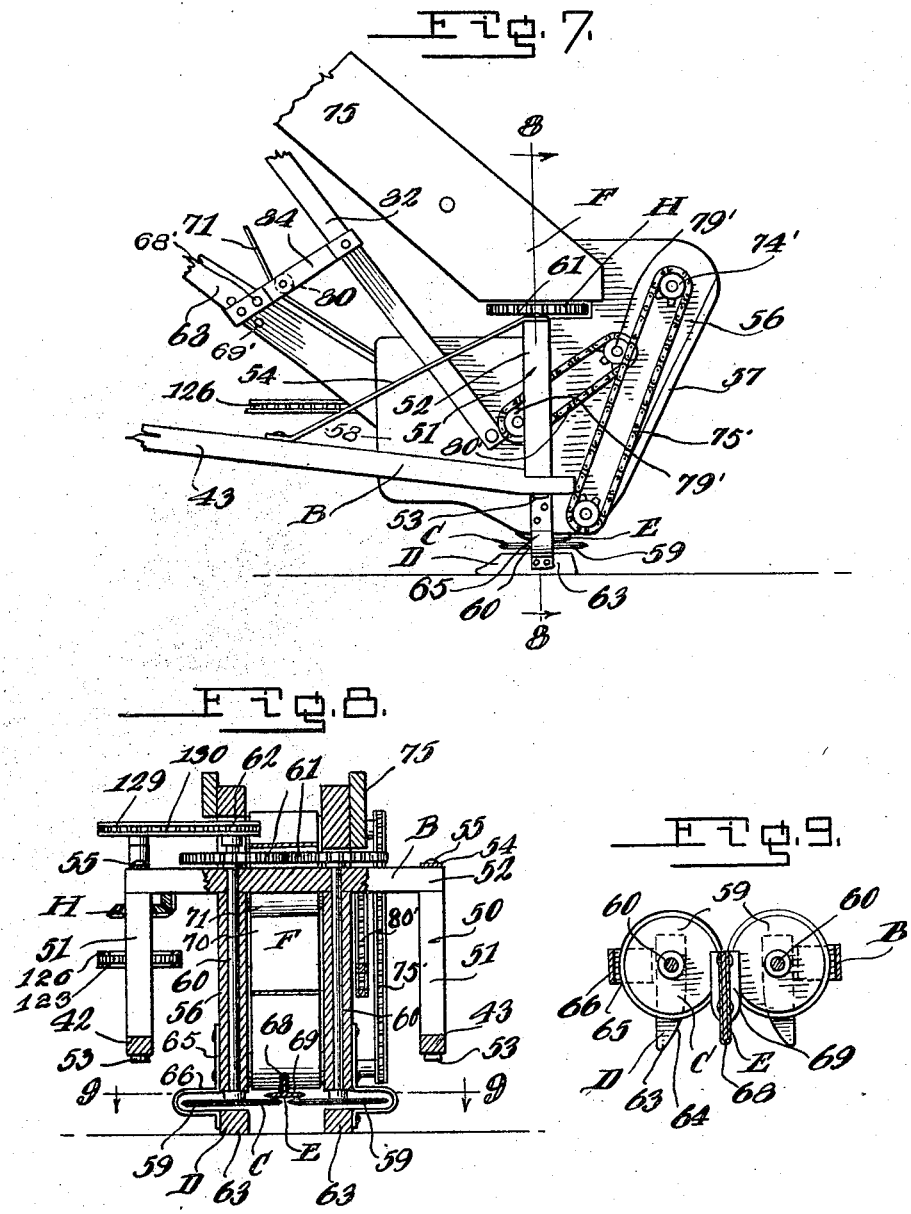

1,513,737

UNITED STATES PATENT OFFICE.

REINHOLD BOHMAN, OF BAY CITY, MICHIGAN.

BEET-TOPPING MACHINE.

Application filed December 29, 1920. Serial No. 433,907.

*To all whom it may concern:*

Be it known that I, REINHOLD BOHMAN, a subject of the King of Sweden, residing at Bay City, in the county of Bay and State of Michigan, have invented certain new and useful Improvements in Beet-Topping Machines, of which the following is a specification.

This invention relates to topping machines, and the primary object of the invention is to provide an improved machine for topping sugar beets prior to the harvesting thereof, so as to eliminate the difficulty heretobefore experienced in harvesting beets, and the time and labor consumed in topping the beets after harvesting.

Another object of the invention is to provide, in a beet topping machine, a novel cutting device for topping the beets; a novel means for operating the cutters; a novel means for shifting the cutters laterally and vertically in accordance with the position of the beets in the ground, and a novel means for elevating the beet tops and delivering the same to one side of the machine.

A further object of the invention is to provide a wheeled main frame, a laterally shiftable and vertically movable supplemental frame carried by the main frame, cutting knives rotatably carried by the supplemental frame, a gauge knife carried by the frame, and an elevator carried by the supplemental frame, the knives and elevator being operated from the main frame in a novel manner so as to permit the continuous uninterrupted operation thereof during the various shifting movements of the supplemental frame.

A still further object of the invention is to provide a lateral conveyor carried by the main frame for receiving the beet tops elevated, so as to permit the tops to be delivered to one side of the machine, the said conveyor being adapted to be projected from either side of the main frame, so as to deliver the beet tops to either side of the frame which may be desired, the conveyor belt having operating means arranged to automatically change the direction of travel of the belt when the conveyor is moved from one side of the machine to the other.

A still further object of the invention is to provide an improved means for driving the various operating parts of the machine from the supporting axle for the main frame, said supporting axle having a novel differential driving means interposed therein, so as to permit the turning of one of the ground wheels faster than the other when making the turns, without affecting the said driving means.

With these and other objects in view, the invention consists in the novel construction, arrangement and formation of parts as will be hereinafter more specifically described, claimed, and illustrated in the accompanying drawings, forming a part of this specification, in which drawings:

Figure 1 is a side elevation of the improved beet topping machine.

Figure 2 is a vertical longitudinal section through the same.

Figure 3 is a top plan view of the improved beet topping machine.

Figure 4 is a front elevation of the improved machine, the draft tongue being shown in section.

Figure 5 is a vertical transverse section taken through the improved machine on the line 5—5 of Figure 1.

Figure 6 is a horizontal longitudinal section through the improved machine.

Figure 7 is a fragmentary side elevation of the rear portion of the improved machine looking at the opposite side from that in Figure 1.

Figure 8 is a detail transverse section through the supplemental frame illustrating the beet topping knives and operating means therefor, and a portion of the elevating mechanism, the section being taken on the line 8—8 of Figure 7.

Figure 9 is a detail horizontal sectional view taken on the line 9—9 of Figure 8, illustrating the improved topping knives.

Figure 10 is a fragmentary detail vertical longitudinal section through the forward portion of the machine taken on the line 10—10 of Figure 3.

Figure 11 is a detail fragmentary vertical section through the drive and supporting axle of the machine illustrating the means for operatively connecting the sections thereof to the master drive gears.

Referring to the drawings in detail, wherein similar reference characters designate like and corresponding parts throughout the same, the letter A indicates the main frame; B, the supplemental frame; C, the topping knives; D, the means for shifting the supplemental frame laterally to center the knives C in relation to the beets; E, the means for raising the supplemental frame for adjusting the knives C in relation to the various heights of beets; F, the elevators for receiving the beet tops from the knives; G, the laterally extending conveyor carried by the main frame; and H, the operating means for the knives, elevator, and conveyor.

The main frame A includes the longitudinally extending side bars 15, the transversely extending end bars 16, and the intermediate brace bars 17. The longitudinally extending side bars 15, and the intermediate brace bars 17, carry depending bearings 18 for the reception of the sections 19 and 20 of the axle 21. The sections 19 and 20 of the axle 21 are polygonal shaped in cross section throughout their entire lengths with the exception of the portions thereof which are fitted within the bearings 18, and the inner ends of the sections 19 and 20 terminate in transversely aligned discs 22 and 23. These sections 19 and 20 are joined together for independent movement by means of a cylinder 24. The discs 22 and 23 are arranged in spaced relation and have mounted between the same on the cylinder 24 for rotary movement, the disc 25, which has formed thereon the master sprocket wheels 26 and 27, which form a portion of the driving mechanism H which will be hereinafter more specifically described. The inner faces of each of the master sprocket wheels 26 and 27 are provided with ratchet teeth 28, which are adapted to be engaged by the pawls 29 which are pivotally connected by means of pins 30 to the inner faces of the discs 22 and 23. This connection forms a simple and convenient means for the driving of the master sprocket wheels 26 and 27 from the axle 21, and allows the axle sections 19 and 20 to rotate at different speeds in relation to each other, so as to allow the ground wheels 31 and 32 to conveniently turn at different speeds when the machine is making turns. The ground wheels 31 and 32 are slidably mounted upon the axle 21, so that the same may be adjusted toward and away from the main frame A so that the machine can conform to the various widths of the rows upon which the machine is operated. The wheels 31 and 32 are held against accidental sliding movement upon the axle 21 by means of suitable set screws 33. The forward transverse bar 16 has secured thereto in any preferred manner the draft tongue 35, to which may be secured the draft animals for drawing the improved beet topping machine over a field. The lower surface of the main frame A has secured thereto a pair of spaced forwardly projecting blocks 36 and 37, which form a bearing for the transversely extending drive shaft 38. The drive shaft 38 also forms the pivot point for the supplemental frame B to permit the same to swing in a vertical plane, as will be hereinafter more specifically described.

The upper surface of the frame A has secured thereto a pair of spaced transversely extending side plates 39 and 40, which are suitably braced intermediate their ends by means of a pair of spaced brace bars 41. These side plates 39 and 40 and the brace bars 41 form a bed for the lateral conveyor G which also will be hereinafter more fully described.

The supplemental frame B includes a pair of longitudinally spaced beams 42 and 43, and these beams extend from the forward end of the main frame to a point rearwardly of the same. The forward ends of these beams 42 and 43 are rotatably mounted upon the shaft 38 as indicated by the numeral 44. These longitudinally extending beams 42 and 43 are made in sections, a front relatively short section 45, and a rear relatively long section 46. These sections are connected together by means of a pivot pin 47, which permits the rear portion of each of the beams 42 and 43 to swing in a horizontal plane laterally of the main frame or the direction of travel. Thus it will be seen that the beams 42 and 43 are permitted to swing in a vertical plane and in a horizontal plane, the purpose of which will be hereinafter more specifically described. A transversely extending substantially rectangular frame 50 is arranged at the rear ends of the beams 42 and 43, and this frame includes the vertically disposed side bars 51 and the upper connecting cross bar 52. The lower terminals of the vertically disposed side bars 51 are connected to the rear ends of the longitudinally extending beams 42 and 43, by means of vertically disposed pivot pins 53. This allows the side bars 51 of the frame 50 to remain in parallel relation to the row of beets and the main frame A during the swinging of the longitudinally extending beams 42 and 43. The beams 42 and 43 are further connected to the frame 50 by means of brace straps 54, and the rear ends of these straps 54 are pivotally connected to the upper ends of the frames by means of pivot pins 55, which are also disposed in a vertical plane.

Arranged intermediate the vertically disposed side bars 51 of the frame 50 is a pair of spaced plates 56, which project rearwardly from the frame 50 and these plates have their forward edges provided with slots for the reception of the horizontally disposed bar 52 of the frame 50, and the side plates are secured thereto in any preferred manner. The side plates 56 are connected together at their rear ends, by means of a rear wall or plate 57. These side plates 56 and the rear plate or wall 57 form a partial housing for the elevating means F which also will be hereinafter more specifically described. Forwardly extending arms 58 are formed on the side plates 56 and these arms are arranged intermediate the longitudinally extending beams 42 and 43.

The topping means C for the beets include a pair of discs 59, which are arranged in a horizontal plane, and these discs have their peripheries provided with cutting edges. Each of the discs is arranged directly below a side plate 56, and is keyed or otherwise secured to a vertically disposed shaft 60, which is rotatably mounted in a suitable bore formed in a side plate 56. These discs 59 extend to the longitudinal center of the supplemental frame B, and are adapted to receive the beet tops therebetween to sever the same from the body. The upper terminals of the shafts 60 have keyed or otherwise secured thereto intermeshing gears 61 which permit the synchronous operation of the discs. The upper end of one of the shafts 60 has keyed or otherwise secured thereto a suitable sprocket wheel 62, which forms a part of the operating means H, which will also be hereinafter more specifically described.

The means D for shifting the supplemental frame B laterally of the main frame in the direction of travel for centering the discs 59 in relation to the beets being topped, consist of a pair of spaced shoes 63, which are arranged directly below the side plates 56. These shoes have their forward ends bevelled outwardly as at 64, and it can be seen that when a beet engages one of the inclined or bevelled inner faces of the shoes that the frame B will be swung laterally, so as to center the knives in relation to the beet. The shoes 63 are connected to the side plates 56 by means of springs 65, which are bowed intermediate their ends, as at 66, for the reception of the discs or knives 59. These springs 65 permit the spreading of the shoe when relatively large beets are encountered. The inner faces of the side plates 56 are also bevelled inwardly as at 67 for the reception of the beet top or foliage.

The means E for raising the supplemental frame B in relation to the beet tops, so that a uniform amount may be cut from each beet, include a longitudinally extending upwardly and forwardly inclined beam or plate 68, which is adjustable as will be hereinafter described. This plate 68 has adjustably secured to its lower end in any preferred manner the gauge knife 69 and if so desired the gauge knife 69 may be and is preferably mounted directly above and intermediate the discs or cutting knives 59 and is formed relatively broad, and the longitudinal edges thereof are sharpened so as to cut the beet tops during the lateral shifting of the supplemental frame B, so as to prevent the retarding of this shifting movement.

The gauge 69 is adjustable forward or backward, so that the position thereof can be varied in relation to the cutting knives 59.

The gauge 69 is adapted to ride over the beet tops and crush the foliage downward, and it can be seen that, as the forwardly and upwardly inclined surface thereof engages the beet top, the supplemental frame B will be either raised or lowered according to the height at which the crown of the beet projects from the ground. Thus a uniform amount is cut from each beet.

In order to permit the free raising of the supplemental frame B, a pair of relatively strong contractile coil springs 70′ are provided, and these coil springs 70′ have their opposite ends secured respectively to the longitudinally extending beams 42 and 43, and to the rear end bar 16 of the main frame A. These springs 70′ practically support the weight of the supplemental frame B, and thus it can be seen that when the gauge knife 69 engages a beet, the frame can be easily raised. By referring to the drawings it can be seen that the tension of these springs can be readily regulated, and suitable wing nuts are mounted upon adjustable stems carried by the springs for permitting this adjustment.

The elevating mechanism F for raising the beet tops and for carrying the same away from the cutting knives or discs 69 includes the conveyors 70, 71 and 72. The conveyor belt 70 is arranged in rear of and above the cutting knives or discs 59. This belt 70 is trained around upper and lower rollers 73 and 74 respectively which are rotatably arranged between the side plates 56. These rollers are provided with extended terminals which have secured thereto sprocket wheels 74′, around which is trained a sprocket chain 75′, so that the rollers will be operated synchronously for actuating the belt 70. The belt 71 extends upwardly and forwardly from the belt 70 to a part intermediate its ends, and this belt has its upper run extending between a pair of upwardly and forwardly extending side plates 75. These side plates have their lower terminals secured to the side plates 56, which have heretobefore been described, and the side plates support a table 76. These side plates 75 project forwardly over the main frame A. The belt 71 is formed relatively narrow and is trained around suitable rollers 77, 78, 79 and 80. The rollers 79 and 77 are rotatably mounted intermediate the side plates 56, while the upper roller 78 is rotatably mounted between the side plates 75 at the upper ends thereof. The outer ends of the rollers 77 and 79 are reduced and have keyed or otherwise secured thereto sprocket wheels 79′ around which is trained a sprocket chain 80′, thus it can be seen that the rollers will be synchronously operated. The roller 80 is arranged intermediate the rollers 79 and 78 and is rotatably carried by a bracing structure 81, which forms a means for supporting the side plates 75. This bracing structure 81 includes the upwardly extending beams 82, which have their lower ends secured to the extended arms 58 of the side plates 56, and their upper ends secured to the side plates 75, by means of a removable rod 81', which is adapted to fit in any of a plurality of apertures 82' formed in the beams 82. The side plates 75 are adapted to swing on the shaft 89 and by placing the rod 81' in any one of the desired apertures 82' the plates 75 and the conveyors 71 and 72 can be raised or lowered. This frame also has secured thereto depending brace bars 83 and 84 which have their lower ends adjustably secured to the longitudinally extending upwardly positioned bar 68, by suitable removable bolts 68', which are adapted to fit in any one of the openings 69' formed in the brace bars and the bar 68. The roller 80 is rotatably carried by the intermediate brace bar 84. The belt 71 is formed relatively narrow and is held in frictional contact with the inner run of the belt 70 by means of the roller 77 which is power driven, and it can be seen that the belt 70 is driven from the belt 71 by frictional contact therewith.

In order to insure of the raising or elevating of the severed beet tops, a relatively broad conveyor belt 72 is provided. This belt 72 extends the entire width between the side plates 75 and is trained around the roller 78, and around a roller 85, which is arranged above and in front of the roller 77 and is rotatably carried by the side plates 75. The relatively narrow belt 71 has its upper run extended around the upper run of the belt 72, and in frictional contact therewith, and this belt on opposite sides of the belt 71 is provided with cleats or flights 86, which are adapted to catch the severed beet tops and carry the same to the top of the supplemental frame B, where the tops are dropped upon the lateral conveyor G which will be hereinafter more specifically described.

The rollers 78 and 85 have their terminals extended beyond one of the side plates 75, and these terminals have secured thereto suitable sprocket wheels 87. These sprocket wheels are in alignment with a sprocket wheel 88 which is secured to an idler shaft 89 rotatably carried by the side plates 75. The idler shaft 89 extends through the side plates 75 and the side plates 56 for pivotally connecting the side plates 75 to the lower frame, and this shaft also has secured thereto a sprocket wheel 90, which is operatively connected by means of a sprocket chain 91 to a sprocket wheel 92 which is keyed to the extended terminal of the roller 77.

This roller 77 is driven by the means H which will also be hereinafter more specifically described. The sprocket wheels 88 and 87 have trained around the same, a longitudinally extending sprocket chain 93, so as to permit the synchronous rotation of the rollers 78 and 85.

The lateral conveyor G includes a conveyor belt 95, and a frame 96, which is mounted for sliding movement upon the plates 39 and 40. The frame 96 includes a pair of transversely extending side bars 97, and the terminals of these bars 97 rotatably support rollers 98, and the belt 95 is trained around these rollers. The frame 96 also includes a table 99 which is secured to the side bars 97. These side bars 97 are of substantially semicylindrical form and the upper surface of the plates 39 and 40 is curved to conform to the configuration thereof and support outwardly extending arcuate guides 100, which are adapted to slidably seat in arcuate grooves 101, formed in the inner surface of the side bars 97. This forms a means for permitting the conveyor G to be swung to either side of the frame. It can be seen that the elevator belts 71 and 72 extend directly over the laterally extending conveyor 95, so that the severed beet tops will fall from the elevator belts on to the conveyor belt 95, and thus the conveyor belt 95 will be permitted to deliver the beet tops to one side of the machine. If so desired, a suitable wagon or barge may be driven alongside of the machine for receiving the severed beet tops.

In order to permit the shifting of the conveyor G from one side to the other, an arcuate rack bar 102 is formed on the lower surface of one of the side plates 97, of the frame 96, and this rack is engaged by a spur gear 103, which is keyed or otherwise secured to a shaft 104, which extends transversely across the bed formed by the plates 39 and 40, and this shaft is rotatably supported by the plates. A crank 105 is secured to one end of the shaft so as to permit the ready rotation thereof.

The rollers have their terminals extending beyond the side plates 97, and these terminals have keyed or otherwise secured thereto gear wheels 106 and 107 respectively. One side plate 97 of the frame 96 also supports on each side of the transverse center thereof, transversely extending shafts 108 and 109, and these shafts have keyed or otherwise secured thereto sprocket wheels 110 and 111 respectively. The sprocket wheels 106 and 110 have trained around the same a sprocket chain 112, while the sprocket wheels 107 and 111 have trained around the same a sprocket chain 113. The shafts 110 and 111 have keyed or otherwise secured thereto the beveled gears 114 and 115 respectively, which form a portion of the driving means H for driving the various operating parts of the machine, and this driving means H will now be described.

The driving means H include the drive shaft 38 as heretofore described, and this drive shaft 38 has keyed or otherwise secured thereto a sprocket wheel 116, which is in direct alignment with the sprocket wheel 26, and the sprocket wheel 26 and the sprocket wheel 116 have trained around the same the drive sprocket chain 117. A bevelled gear wheel 118 is keyed to the drive shaft 38 and this bevelled gear has meshing therewith a bevelled gear wheel 119 which is keyed or otherwise secured to a vertically disposed counter shaft 120 which is rotatably carried by a bracket 121 which is secured to the blocks 36 and 37. This vertically disposed counter shaft 120 also has keyed or otherwise secured thereto a sprocket wheel 122 which is in alignment with a sprocket wheel 123 which is keyed or otherwise secured to a vertically disposed shaft 124, which is rotatably carried by suitable bearing blocks 125 carried by one of the side bars 51 of the frame 50. These sprocket wheels 122 and 123 have trained around the same the drive sprocket chain 126. The vertically disposed shaft 124 has keyed or otherwise secured thereto a bevel gear 127, which meshes with a bevel gear 128 which is secured or otherwise fastened to the extended terminal of the drive roller 77. The extended terminal of the drive roller 77 also has secured thereto in any preferred manner the sprocket wheel 92. Thus it can be seen that the belts 71, 70 and 72 will be operated synchronously. In order to permit of the operation of the cutting or topping means C, the upper end of the shaft 124 has keyed or otherwise secured thereto the sprocket wheel 129, which is in the same plane with the sprocket wheel 62 carried by one of the shafts 60, and these sprocket wheels 62 and 129 have trained around the same the drive sprocket chain 130.

It is preferred that the belts 70, 71 and 72 be driven at a relatively low rate of speed, while the topping means C be driven at a relatively high rate of speed.

The cross brace bars 41 of the plates 39 and 40 support a counter shaft 131, which is arranged above the drive axle 21. This shaft has keyed or otherwise secured thereto intermediate its ends, a sprocket wheel 132, and this sprocket wheel and the master sprocket wheel 27 have trained around the same a drive sprocket chain 133. The shaft 131 adjacent to its terminals has secured thereto a relatively large bevelled gear 134 and a bevelled gear wheel 135. The gear wheels 134 and 135 are adapted to be engaged respectively by the gears 114 and 115, and when the laterally extending conveyor G is arranged at one side of the machine, the gear 114 engages the gear wheel 134 and drives the conveyor belt 95 in one direction, and when the conveyor G is arranged in the opposite side of the machine, the gear 115 engages the bevelled gear or wheel 135, and the belt is driven in the opposite direction.

Thus it can be seen that a convenient means has been provided for driving the conveyor belt 95 in opposite directions for delivering the severed beet top to either side of the machine.

In operation of the improved machine, the same is driven down a row of beets, the tops of which are to be severed, and the guide shoes 63 will move the frame B laterally in accordance with the position of the beets in the ground, so that the knives 59 will effectively sever the tops of the beets irrespective of their position in the ground and the gauge E will move the same vertically so as to raise or lower the knives in accordance with the heights of the crowns of the beets from the ground. After the tops have been severed, the same will be engaged by the upwardly extending belt 70 and be pulled upwardly between the belts 70 and 71, after which the same will be brought forwardly by means of the belts 71 and 72 and then dropped on the laterally extending conveyor G. The conveyor belt 95 will then deliver the severed beet top to either side of the machine according to the position thereof.

From the foregoing description, it can be seen that an exceptionally simple and durable beet topping machine has been provided, in which a novel driving means for the operating parts has been incorporated, so as to prevent the slack in any of the driving means during the lateral and vertical shifting of the supplemental frame B.

Changes in details may be made without departing from the spirit or scope of this invention; but,

I claim:

1. A beet topping machine comprising a main frame, an axle rotatably carried by the main frame, ground wheels secured to the axle, a counter drive shaft carried by the main frame arranged adjacent to the forward end thereof, means for driving the counter shaft from said axle, a supplemental frame pivotally secured to the counter shaft, beet topping knives carried by the supplemental frame, an elevator arranged in rear of the beet topping knives, and means for operating the beet topping knives and the elevator from said counter shaft.

2. A beet topping machine comprising a main frame, a drive axle, a counter shaft carried by the main frame, means operatively connecting the axle with the counter shaft, a supplemental frame hingedly secured to the countershaft, topping knives carried by the supplemental frame, an elevator arranged in rear of the topping knives, a laterally extending conveyor carried by the main frame, and means for operating the conveyor elevator and topping knives from the counter shaft and axle.

3. A beet topping machine comprising a main frame, a drive axle carried by the main frame, adjustable ground wheels secured to the axle, a counter-shaft carried by the main frame, a laterally and vertically swinging supplemental frame carried by said counter-shaft, a pair of rotary disc knives carried by the supplemental frame, an upwardly extending elevator belt arranged in rear of the disc carried by the supplemental frame, a forwardly extending relatively narrow conveyor belt carried by the supplemental frame and arranged in front of and in frictional contact with the first mentioned conveyor belt, a relatively broad conveyor belt arranged intermediate the runs of the second mentioned conveyor belt and in frictional contact with the upper run thereof, means for operating the disc knives and the conveyor belts from said counter shaft, a laterally shiftable conveyor carried by the main frame and arranged below the second and third mentioned conveyor belts, and means for operating the laterally shiftable conveyor belt from said axle.

4. A beet topping machine comprising a main frame, a laterally and vertically swinging supplemental frame carried by the main frame, beet topping knives carried by the supplemental frame, beet engaging guide shoes arranged below the topping knives and one each side of the meeting faces thereof for centering the knives in relation to the beets being topped, and leaf springs for connecting the guide members to the supplemental frame whereby spreading of the shoes will be permitted.

5. A beet topping machine comprising a main frame, a supplemental frame secured to the main frame for lateral and vertical movement in relation to the direction of travel of the machine, beet topping mechanism carried by the supplemental frame, means carried by the supplemental frame to shift the same laterally to center the beet topping means in relation to the beets being acted upon, a supporting bar adjustably carried by the supplemental frame, means adjustably carried by the bar for raising the frame in relation to the beets being acted upon, a forwardly extending conveyor for receiving the beet tops, and means for raising and lowering the conveyor.

6. A beet topping machine comprising a main frame, a supplemental frame disposed in rear of the main frame including a pair of longitudinally extending side bars pivotally secured to the main frame, and a second frame forming a part of said supplemental frame hingedly secured to longitudinally extending side bars, each of the longitudinally extending side bars including hingedly connected sections, a pair of rotatable shafts carried by the second frame, a disc secured to each one of said shafts having the sharpened peripheral cutting edge, means connecting the shafts together for synchronous movement, guide shoes carried by the supplemental frame below said discs, a gauge knife arranged above and intermediate the knives carried by the second frame, the side edges of the knives being sharpened, and means for rotating said shafts.

7. A beet topping machine comprising running gear, a main frame supported by the running gear, a supplemental frame adjustably secured to said main frame for vertical and lateral adjustable movements, beet topping knives carried by the supplemental frame, elevator means carried by the supplemental means, a conveyor carried by the main frame for selective lateral disposition of material deposited thereon from the elevator, and means for driving said beet topping knives, elevator, and conveyor from said running gear.

REINHOLD BOHMAN.